(12) United States Patent
Vordermeier

(10) Patent No.: US 11,273,715 B1
(45) Date of Patent: Mar. 15, 2022

(54) CHARGING SYSTEM FOR BATTERY POWERED ELECTRIC VEHICLES

(71) Applicant: Alan Vordermeier, Wellington, FL (US)

(72) Inventor: Alan Vordermeier, Wellington, FL (US)

( * ) Notice: Subject to any disclaimer, the term of this patent is extended or adjusted under 35 U.S.C. 154(b) by 198 days.

(21) Appl. No.: 16/687,060

(22) Filed: Nov. 18, 2019

Related U.S. Application Data

(60) Provisional application No. 62/769,089, filed on Nov. 19, 2018.

(51) Int. Cl.
| | | |
|---|---|---|
| *B60L 50/10* | (2019.01) | |
| *H02J 7/14* | (2006.01) | |
| *B60L 53/22* | (2019.01) | |
| *F01N 3/10* | (2006.01) | |
| *B60L 50/60* | (2019.01) | |
| *H01M 50/20* | (2021.01) | |

(52) U.S. Cl.
CPC ............... *B60L 50/10* (2019.02); *B60L 50/66* (2019.02); *B60L 53/22* (2019.02); *F01N 3/10* (2013.01); *H01M 50/20* (2021.01); *H02J 7/1423* (2013.01); *B60L 2210/40* (2013.01); *H01M 2220/20* (2013.01)

(58) Field of Classification Search
CPC .......... B60L 50/10; B60L 50/66; B60L 53/22; B60L 2210/40; H01M 50/20; H01M 2220/20; H02J 7/1423; F01N 3/10
USPC ........................................................ 320/109
See application file for complete search history.

(56) References Cited

U.S. PATENT DOCUMENTS

| | | | | |
|---|---|---|---|---|
| 5,162,720 A | * | 11/1992 | Lambert | H02J 7/0024 320/104 |
| 5,539,286 A | * | 7/1996 | Brinkmeyer | H02P 9/48 318/139 |
| 6,954,045 B2 | * | 10/2005 | Nishikawa | B60L 7/24 318/376 |
| 9,037,334 B1 | * | 5/2015 | Cole | B60W 10/26 701/22 |
| 9,873,408 B2 | * | 1/2018 | Capizzo | C25B 1/04 |
| 10,020,721 B2 | * | 7/2018 | Davis | H02J 7/34 |
| 10,946,756 B2 | * | 3/2021 | Malek | H02M 3/33584 |
| 2011/0115425 A1 | * | 5/2011 | Olsson | B60L 3/04 320/101 |

(Continued)

FOREIGN PATENT DOCUMENTS

| | | | | |
|---|---|---|---|---|
| CN | 201486712 U | * | 5/2010 | |
| CN | 202491672 U | * | 10/2012 | ............. Y02T 10/62 |

(Continued)

*Primary Examiner* — M Baye Diao
(74) *Attorney, Agent, or Firm* — Daniel S. Polley, P.A.

(57) ABSTRACT

A novel electric vehicle that is preferably powered with two battery packs to extend the range of the vehicle before recharging is required. The vehicle can be provided with a customized onboard generator or turbocharged generator that can operate on regular unleaded gasoline which is used for charging the battery packs while the car is in motion. The generator charges one battery pack while the car is operating on the other and can be preferably controlled in the cockpit of the vehicle. The vehicle can also still be charged through a conventional charging outlet, which also eliminates need to burn gas by the generator during conventional charging.

4 Claims, 1 Drawing Sheet

(56) References Cited

U.S. PATENT DOCUMENTS

| | | | | |
|---|---|---|---|---|
| 2013/0026823 A1* | 1/2013 | Fetzer | .................... | B60R 16/03 |
| | | | | 307/9.1 |
| 2013/0066499 A1* | 3/2013 | Niste | .................... | B60L 3/0046 |
| | | | | 701/22 |
| 2014/0250909 A1* | 9/2014 | Sowden | .................. | F02C 7/266 |
| | | | | 60/778 |
| 2014/0257614 A1* | 9/2014 | Niizuma | ................ | H02J 50/12 |
| | | | | 701/22 |
| 2015/0097448 A1* | 4/2015 | Davis | .................... | H02K 53/00 |
| | | | | 307/150 |
| 2018/0281597 A1* | 10/2018 | Herb | ........................ | B60K 1/02 |
| 2019/0143822 A1* | 5/2019 | Malek | ............... | H02M 3/33584 |
| | | | | 320/109 |
| 2019/0359067 A1* | 11/2019 | Hu | ........................ | H02J 7/0014 |

FOREIGN PATENT DOCUMENTS

| | | | | |
|---|---|---|---|---|
| DE | 102011121245 A1 * | 7/2012 | ............. | B60L 1/003 |
| JP | 2015523257 A * | 8/2015 | | |

* cited by examiner

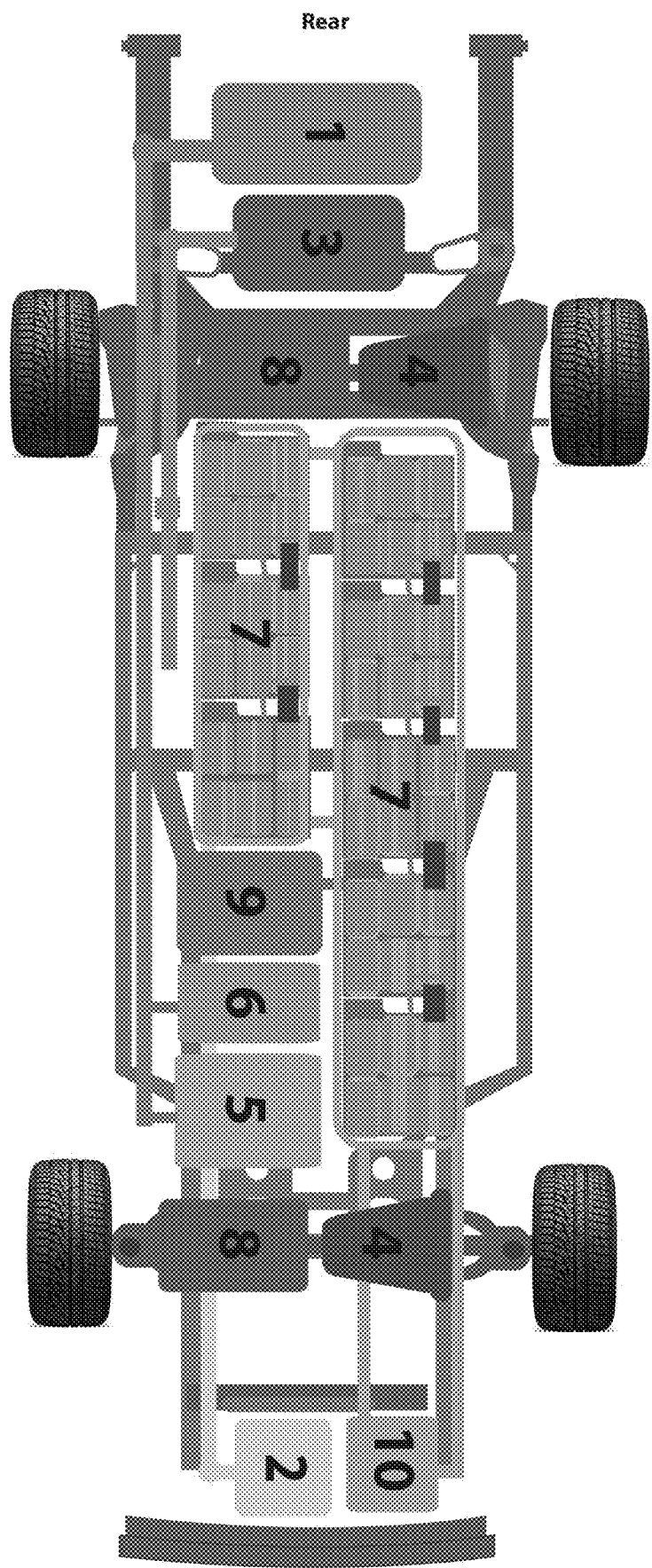

CHARGING SYSTEM FOR BATTERY POWERED ELECTRIC VEHICLES

This application claims the benefit of and priority to U.S. Provisional Patent Application Ser. No. 62/769,089, filed Nov. 19, 2018, which is incorporated by reference in its entirety for all purposes.

1. FIELD OF THE DISCLOSURE

The disclosure relates generally to motor vehicles and particular to electric vehicles battery powered by one or more battery packs.

2. BACKGROUND

One current problem with 100% battery powered vehicles is when the vehicle needs charging, a charging station may not be nearby, or the station may not be available or in use. Also, the charging station may not have the correct connectors to hook up the vehicle/vehicle batteries with the energy source at the station. Another problem with 100% battery powered vehicles is the limited range available before the vehicle needs to be recharged. This range is typically much less than the range of an equivalent vehicle conventionally powered by a combustion engine. It is to these problems that the below described novel motor vehicle is directed to overcoming or reducing.

SUMMARY OF THE DISCLOSURE

Generally disclosed is a novel electric vehicle that is preferably 100% battery powered with two battery packs and in a preferred embodiment provides for approximately a range of 620 miles before the needing to be recharged. The vehicle can be provided with a customized onboard generator or turbocharged generator that can operate on regular unleaded gasoline which is used for charging the battery packs while the car is in motion. The generator charges one battery pack while the car is operating on the other and can be controlled in the cockpit of the vehicle. The vehicle can also still be charged through a conventional charging outlet, which also eliminates need to burn gas by the generator during conventional charging.

The use of the generator provides for a convenience to the user/consumer by providing more range before the user has to worry about recharging their vehicle while away from home. The generator can be provided with a custom designed catalytic converter to capture the exhaust it exerts and recycles that exhaust to a negligible level of emissions. By incorporating the novel generator into the operation/charging of the vehicle batteries, the user's driving experience resembles their current lifestyle of stopping at a gas station to fill a gas tank (albeit for the generator not a vehicle combustion engine) as opposed to looking for a charging station, hoping that charging station is available and has the proper connecting apparatus for their vehicle.

Compared to current battery powered vehicles, the disclosed novel vehicle provides more range to a user before recharging of the vehicle is required through an outside power source.

In one non-limiting vehicle embodiment, the vehicle can have the following characteristics: curb weight can be approximately 2500 to 4000 lbs, battery range approximately 620 miles, battery capacity approximately 95 Kw/50 Kw in a two configuration or approximately 150 Kw in a single configuration; top speed approximately 200 MPH, horsepower approximately 600 BHP, wheelbase 106.7 and a 1 speed auto transmission.

Though also not limiting, the novel motor vehicle can be an automobile, sedan, SUV, truck, etc. and is not considered limited to any particular type of motor vehicle.

In one non-limiting embodiment, the vehicle body can be constructed from aluminum and different vehicle designs use the same sub-frame for vehicles having the same wheelbase.

BRIEF DESCRIPTION OF THE DRAWINGS

The FIGURE is a block diagram of the main components of the novel battery powered vehicle in accordance with the present disclosure.

DETAILED DESCRIPTION

A novel battery powered motor vehicle is disclosed. The vehicle includes one or more battery packs (and preferably multiple battery packs—though not limiting), electric motor and controller. Other features and operation of the vehicle that is not disclosed herein is considered to operate and be similar to like features on current battery powered motor vehicles and such information is incorporated by reference. Accordingly, the below discussion will focus on the new and novel aspects of the instant battery powered motor vehicle.

As seen in the drawing FIGURE, the disclosed novel motor vehicle packages and configures its components in a unique matter to differentiate from other electric cars and which provided for an extended driving range for the vehicle as compared to current electric cars.

The disclosed electric vehicle is preferably provided with two rechargeable battery packs 7, with the larger battery pack 7 preferably being the primary battery pack and the potentially smaller battery pack being a secondary battery pack. It is also within the scope of the disclosure to have both battery packs be of the same size and/or capabilities. Both battery packs 7 are preferably used solely for driving range and not for other vehicle operations requiring power or energy (i.e. vehicle lights, radio, air conditioning, etc.). The secondary battery pack 7 extends the driving range of the vehicle or to give unlimited range with the generator running. Preferably, both battery packs 7 can be packaged low in the car for better weight distribution and vehicle handling.

The novel design includes generator 1 for charging the battery packs 7 while the car is in motion. Preferably, generator 1 can be a conventional generator or a turbocharged generator and various types of generators can be used and are considered within the scope of the disclosure. Though not considered limiting, the power source for generator 1 can preferably be an internal combustion engine or a turbine powered engine.

By charging the battery pack while the vehicle is in motion, the vehicle is allowed to continue to be driven even after the primary battery pack 7 has used up all of its available range (i.e. energy depleted). When primary battery pack is depleted, the vehicle switches over to the secondary battery pack 7 to maintain safe operation of the vehicle while concurrently allowing generator 1 to charge primary battery pack 7 while the car is in motion and being powered by the secondary battery pack. Accordingly, when the secondary battery pack 7 is depleted the vehicle can switch back to the primary battery pack 7 (now recharged by generator 1) again while the vehicle in motion. Preferably, a range of approximately 620-775 miles can be achieved with this novel configuration, though such is not considered limiting and other ranges or approximate amounts may be achieved and are considered within the scope of the disclosure.

Preferably, while the vehicle is running on the secondary battery pack 7, a preferred approximate 155 miles of driving range provided from secondary battery pack 7 is enough to fully charge the primary battery pack 7 back to its 100% capacity of approximately 310 miles. Similarly, these mileage ranges are preferred and not considered limiting and it is within the scope of the disclosure that the vehicle employing the novel charging system can achieve other mileage figures. Preferably, after secondary battery pack 7 is run to capacity, the vehicle switches back to primary battery pack 7 for an additional 310 miles of driving range. All of the switching of battery packs can be done inside the vehicle (i.e. on the dashboard) while the vehicle remains in motion. In this non-limiting example, the vehicle is provided with about 620-775 miles of total range without having to stop to conventionally charge battery packs 7 or put gasoline in generator 1. The non-limiting example of 620-775 miles of driving range, provides for a longer range of driving as compared to current electric cars, and without the user having to stop the vehicle to conventionally recharge the batteries as with current electric cars. In one non-limiting embodiment, generator 1 can be an internal combustion small displacement generator, preferably powered by unleaded gasoline, though such is not considered limiting. As referenced above, generator 1 can be turbocharged to help with efficiency and emissions and can also be provided with a Catalytic Convertor to make its operation as clean as possible.

Generator 1 is provided for charging one or both battery packs 7 while the vehicle is in motion. Additionally, generator 1 can also be used for battery recharging, when the vehicle is not in motion, particularly when conventional "plug-in" charging is not available or desired. Having the ability to charge batteries 7 while the vehicle is in motion provides the novel electric vehicle described herein with superior driving range as compared to other electric vehicles. Preferably, generator 1 is used for increasing the driving range of the vehicle and is preferably not used for other normal electric car operations. Batteries 7 can also be charged at home, office or at charging stations similar or the same as other conventional electric vehicles.

For other non-driving normal vehicle operations requiring power (i.e. lights, radio, air-conditioning, windows, etc.), a separate battery can be provided and can be preferably a 12-volt battery 9. 12-volt battery 9 that is used for powering vehicle items like the dashboard gauges, generator 1, infotainment features and other vehicle systems. The addition of a separate battery 9, allows the vehicle to use battery packs 7 and generator 1 for the purpose of maximum driving range. Preferably, 12 v battery 9 can be a Lithium Ion battery, for weight considerations, though other batteries can also be used and are considered within the scope of the disclosure.

The motor controller and inverter 2 can be provided for converting the battery DC power to AC for the electric drive motors. These components are similar to like components in current electrical vehicles and their use and operation in current electrical vehicles is incorporated by reference.

A vehicle control unit 3 can be provided and preferably serves as the brains for the disclosed electric vehicle. Unit 3 controls the power to the motors and to all the vehicle systems and can also control the charging of the batteries, including controlling generator 1. A gearbox 4 can takes input from an electric motor 8 and also houses the differential. From there individual axles preferably power each wheel. Gearbox 4 can also house the final drive gear to achieve the acceleration vs top speed of the vehicle.

An AC on-board charger 5 can be provided for charging the main DC batteries while being plugged into an outside source (i.e. conventional charging). Charger 5 can also be used to regulate the charging current from on-board generator 1. A DC/DC charger 6 can also be provided and used for charging the 12 V battery 9, that is used for powering generator 1 and some of the vehicle systems as discussed above.

Electric motors 8 provide the source of propulsion for the vehicle. The location of electric motors 8 are not considered limited to any particular spot on the vehicle and can depend on the platform layout chosen for the vehicle. Preferably, the materials for motor 8 can be selected based on being lightweight and power as factors, though such is not considered limiting.

A liquid cooling system 10 can be integrated into the vehicle to cool necessary systems of the vehicle. System 10 can be provided with an electric water pump and radiator and is preferably located near the front of the vehicle, though such location is not considered limiting. A hot water-based coolant can also be used for cabin heating and a defroster system for the vehicle.

Though not considered limiting, the vehicles can preferably use an aluminum alloy as the primary material in view of its relative light weight. Certain parts of the vehicle can be made with carbon fiber parts, such as, but not limited to, rear wing, rear view mirror, etc.)

Battery packs 7 can be preferably lithium ion battery packs, though other types of battery can be used and are also considered within the scope of the disclosure. Solid state battery packs can also be used and are also considered within the scope of the disclosure.

In one embodiment, the vehicle can have the following non-limiting features, benefits and/or advantages:
1. Primary range—app. 310 miles (95 Kw battery pack)
2. Secondary range—app. 155 miles (50 Kw battery pack)
3. Generator—(preferably holds up to 30 US gallons of unleaded gasoline)
4. 12 Volt battery is used to power up the generator and powers the dashboard and infotainment features As an alternative embodiment, the novel charging system can operate with a single battery pack and generator. Furthermore, more than two battery packs can also be employed and thus using one or more battery packs along with the generator are all considered within the scope of the disclosure.

The generator is not limited to any particular gas or energy source and various types of energy/fuel sources can be used including, without limitation, gasoline, diesel, ethanol, hydrogen, liquid gas, liquefied natural gas, kerosene, jet propellant, LNG, JP4, etc.

Preferably, the size of the tank for the generator can by anywhere between about 10 gallons to about 30 gallons, though this range is not considered limiting, and other ranges can be selected and tank sizes smaller or larger than those falling within the preferred range can also be used and are considered within the scope of the disclosure.

It should be understood that the exemplary embodiments described herein should be considered in a descriptive sense only and not for purposes of limitation. Descriptions of features or aspects within each embodiment should typically be considered as available for other similar features or aspects in other embodiments. While one or more embodiments have been described with reference to the FIGURES, it will be understood by those of ordinary skill in the art that various changes in form and details may be made therein without departing from their spirit and scope.

All components and parts of the described system and their locations, electronic communication methods between the system components, power storage devices, energy storage devices, electronic storage mechanisms, etc. discussed above or shown in the drawings, if any, are merely by way of example and are not considered limiting and other parts and component(s) and their locations, electronic communication methods, power storage devices, energy storage devices, electronic storage mechanisms, etc. can be chosen and used and all are considered within the scope of the disclosure.

The above disclosed mile ranges, miles figures, power values, dimensions, weights, etc. are also considered as non-limiting examples and other values may be used or achieved and are also considered within the scope of the disclosure.

Unless feature(s), part(s), component(s), characteristic(s) or function(s) described in the specification or shown in the drawings for a claim element, claim step or claim term specifically appear in the claim with the claim element, claim step or claim term, then the inventor does not consider such feature(s), part(s), component(s), characteristic(s) or function(s) to be included for the claim element, claim step or claim term in the claim when and if the claim element, claim step or claim term is interpreted or construed. Similarly, with respect to any "means for" elements in the claims, the inventor considers such language to require only the minimal amount of features, components, steps, or parts from the specification to achieve the function of the "means for" language and not all of the features, components, steps or parts describe in the specification that are related to the function of the "means for" language.

The benefits, advantages, solutions to problems, and any element(s) that may cause any benefit, advantage, or solution to occur or become more pronounced are not to be construed or considered as a critical, required, or essential features or elements of any or all the claims.

While the battery powered vehicle has been described and disclosed in certain terms and has disclosed certain embodiments or modifications, persons skilled in the art who have acquainted themselves with the disclosure, will appreciate that it is not necessarily limited by such terms, nor to the specific embodiments and modification disclosed herein. Thus, a wide variety of alternatives, suggested by the teachings herein, can be practiced without departing from the spirit of the disclosure, and rights to such alternatives are particularly reserved and considered within the scope of the disclosure.

What is claimed is:

1. An electric motor vehicle, comprising:
   a vehicle body;
   a first rechargeable battery pack disposed within or on the vehicle body;
   a second rechargeable battery pack disposed within or on the vehicle body;
   a first electric motor and a first gear box associated with a first axle of the motor vehicle;
   a second electric motor and a second gear box associated with a second axle of the motor vehicle;
   a motor controller and inverter in communication with the first rechargeable battery pack and the second rechargeable battery pack;
   a vehicle control unit in communication with the motor controller and inverter;
   wherein the motor controller and inverter converts DC Power received from the first rechargeable battery pack or the second rechargeable battery pack to AC;
   wherein the motor controller and inverter is in communication with the first electric motor and the second electric motor and supplies the converted AC to the first electric motor and the second electric motor upon command from the vehicle control unit;
   an internal combustion engine small displacement generator powered by gasoline in communication with the first rechargeable battery pack and the second rechargeable battery pack for recharging the first battery pack and the second battery pack while the motor vehicle is moving upon command from the vehicle control unit; and
   a DC power source for supplying power to the generator and other electrical systems contained within the electric motor vehicle;
   wherein the generator is provided for only charging the first rechargeable battery pack and the second rechargeable battery pack and not any other electrical components of the motor vehicle.

2. The electric motor vehicle of claim 1 wherein the generator is turbocharged.

3. The electric motor vehicle of claim 1 wherein the vehicle control unit is located at or near a rear end of the motor vehicle.

4. The electric motor vehicle of claim 1 wherein an amount of power provided by the first rechargeable battery pack is larger than an amount of power provided by the second rechargeable battery pack.

* * * * *